United States Patent
McHugh et al.

(10) Patent No.: US 11,352,870 B2
(45) Date of Patent: *Jun. 7, 2022

(54) METHOD OF, AND A SYSTEM FOR, CONTROLLING A DRILLING OPERATION

(71) Applicant: Technological Resources Pty Ltd, Melbourne (AU)

(72) Inventors: Charles Benjamin McHugh, Kensington (AU); Eric William Nettleton, Research (AU)

(73) Assignee: Technological Resources Pty Ltd, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,028

(22) Filed: Jul. 17, 2020

(65) Prior Publication Data

US 2020/0347715 A1 Nov. 5, 2020

Related U.S. Application Data

(63) Continuation of application No. 16/165,151, filed on Oct. 19, 2018, now Pat. No. 10,746,012, which is a continuation of application No. 14/889,080, filed as application No. PCT/AU2014/000502 on May 7, 2014, now Pat. No. 10,125,597.

(30) Foreign Application Priority Data

May 8, 2013 (AU) ................................ 2013901627

(51) Int. Cl.
*E21B 44/02* (2006.01)
*E21B 7/02* (2006.01)
*E21B 49/00* (2006.01)
*G05B 13/02* (2006.01)

(52) U.S. Cl.
CPC ................ *E21B 44/02* (2013.01); *E21B 7/02* (2013.01); *E21B 49/003* (2013.01); *G05B 13/021* (2013.01)

(58) Field of Classification Search
CPC .......... E21B 44/02; E21B 49/003; E21B 7/02; G05B 13/021
USPC .......................................................... 702/9
See application file for complete search history.

(56) References Cited

U.S. PATENT DOCUMENTS 4,819,320 A 4/1989 Cairns et al.
6,272,434 B1 * 8/2001 Wisler ................. E21B 44/005
702/9

(Continued)

OTHER PUBLICATIONS

Jun. 3, 2014—(WO) International Search Report and Written Opinon—PCT/AU2014/000502.

*Primary Examiner* — John H Le
(74) *Attorney, Agent, or Firm* — Banner & Witcoff, Ltd.

(57) ABSTRACT

A system 10 for controlling a drilling operation by a drill rig 12 includes a receiver 16 for receiving sensed data related to the drilling operation. A processor 18 is in communication with the receiver 16, the processor 18 processing the sensed data to estimate at least one geological property of interest of a zone 20 in which the drill rig 12 is active. The processor 18 is configured to operate as a decision engine 22 to optimize the drilling operation automatically by changing at least one drilling related parameter during the drilling operation based on the at least one geological property of interest.

8 Claims, 3 Drawing Sheets

(56) References Cited

U.S. PATENT DOCUMENTS

| | | | |
|---|---|---|---|
| 8,838,426 B2* | 9/2014 | Aldred | E21B 41/0092 |
| | | | 703/10 |
| 10,108,155 B2* | 10/2018 | Aldred | E21B 7/04 |
| 10,125,597 B2* | 11/2018 | McHugh | E21B 7/02 |
| 10,746,012 B2* | 8/2020 | McHugh | E21B 7/02 |
| 2002/0120401 A1 | 8/2002 | Macdonald et al. | |
| 2003/0168257 A1* | 9/2003 | Aldred | E21B 44/00 |
| | | | 175/24 |
| 2011/0220410 A1* | 9/2011 | Aldred | E21B 44/00 |
| | | | 175/26 |

* cited by examiner

METHOD OF, AND A SYSTEM FOR, CONTROLLING A DRILLING OPERATION

CROSS-REFERENCE TO RELATED APPLICATIONS

This application is a continuation of, and claims priority to, U.S. application Ser. No. 16/165,151 filed Oct. 19, 2018, now allowed, which is a continuation of, and claims priority to, U.S. application Ser. No. 14/889,080 filed Nov. 4, 2015, now U.S. Pat. No. 10,125,597, which is a national phase application under 35 U.S.C. § 371 of International Application No. PCT/AU2014/000502, filed on May 7, 2014, which claims priority from Australian Provisional Patent Application No 2013901627 filed on May 8, 2013. The contents of each application are incorporated herein by reference in their entirety.

TECHNICAL FIELD

This disclosure relates, generally, to controlling a drill rig and, more particularly, to a method of, and a system for, controlling a drilling operation. The disclosure has particular, but not necessarily exclusive, application in controlling a drill rig for drilling blast holes on a bench in an open cut mine. It will, however, be appreciated that the disclosure could apply to the drilling of exploration holes or to the drilling of an array of holes in a mine face in underground mines.

BACKGROUND

At present, automated drill rigs are used whether for autonomously drilling blast holes in a drill bench of an open cut mine or in a mine face of underground mines. However, operator oversight is required to monitor the state of drilling of the drill rig to ensure that the measurement while drilling (MWD) data remains within specification. Reasons for the MWD data falling outside specification include a worn drill bit, an incorrect drill bit for the geological conditions or an incorrect drill bit for the required mode of drilling for the geological conditions.

Should the operator determine that the MWD data is outside specification, the operator needs to determine if it is preferable to change the drill bit to provide improved efficiency or to continue with the drilling operation with the current drill bit albeit with the MWD data outside specification. The reason for this is that changing a drill bit is a relatively time consuming process and any benefit that may be gained from changing the drill bit may be outweighed by the time taken to do so.

SUMMARY

In one aspect, there is provided a method of controlling a drilling operation by a drill rig, the method including
  sensing data related to the drilling operation;
  processing the sensed data to estimate at least one geological property of interest of a zone in which the drill rig is active; and
  based on the at least one geological property of interest, automatically optimising the drilling operation by changing at least one drilling related parameter during the drilling operation.
In this specification, the term "drilling related parameter" is to be understood, unless the context clearly indicates otherwise, as being a parameter other than those mechanical drill data of the drill rig that provide the sensed data and the "drilling related parameter" includes at least one of a drill bit of a drill string of the drill rig and a drill model for the area to be drilled by the drill rig. Further, the term "automatically" is to be understood, unless the context clearly indicates otherwise, as being a system decision rather than an operator decision.

The method may include selecting the data sensed from the group consisting of: mechanical drill data (such as rotation speed, rotation direction, pull down speed, pull down pressure, pull up speed, depth sensor, air pressure, water fluid flow rate, navigation position, rotation pressure, bit pressure, or the like), geophysical data, geochemical data, and any combination of the foregoing.

The method may include providing the sensed data, via a communications link, to a processor for processing the sensed data to estimate the at least one geological property of interest, the at least one geological property of interest including strata boundaries and metrics related to substrate hardness. The processor may be mounted on the drill rig or, instead, the processor may be located remotely.

The method may include optimising the drilling operation in respect of at least one specified criterion. The method may include selecting the at least one specified criterion from the group consisting of: maximising rate of penetration of the drill bit or minimising time taken to drill a hole, maximising bit life, maximising the rate of drilling the zone by changing an order in which holes of a drill pattern for the zone are to be drilled, and any of combination of the foregoing.

The method may include optimising the drilling operation by modifying the operation of the drill rig directly based on the data sensed. In addition, or instead, the method may include optimising the drilling operation by updating a model of the drilling operation based on the data sensed and controlling the drill rig using the updated model.

Where the at least one drilling related parameter to be changed includes changing the drill bit of the drill rig, the method may include factoring in the time taken to change the drill bit in determining whether or not such an action optimises the drilling operation.

The method may include changing the drill bit in dependence on a mode of drilling of the drill rig, for example, rotary or percussive drilling, selected to optimise the drilling operation.

In a second aspect, there is provided a system for controlling a drilling operation by a drill rig, the system including
  a receiver for receiving sensed data related to the drilling operation;
  a processor in communication with the receiver, the processor processing the sensed data to estimate at least one geological property of interest of a zone in which the drill rig is active; and
  wherein the processor is configured to operate as a decision engine to optimise the drilling operation automatically by changing at least one drilling related parameter during the drilling operation based on the at least one geological property of interest.

The sensed data may be selected from the group consisting of: mechanical drill data, geophysical data, geochemical data, and any combination of the foregoing.

The system may include a communications link for providing the sensed data from the receiver to the processor.

The at least one geological property of interest may include strata boundaries and metrics related to substrate hardness.

The processor, operating as the decision engine, may be configured to optimise the drilling operation for at least one specified criterion. The at least one specified criterion may be selected from the group consisting of: maximising rate of penetration of the drill bit or minimising time taken to drill a drill hole, maximising bit life, maximising the rate of drilling the zone by changing an order in which holes of a drill pattern for the zone are to be drilled, and any of combination of the foregoing.

The processor may be configured, where the at least one drilling related parameter to be changed includes changing the drill bit of the drill rig, to factor in the time taken to change the drill bit in determining whether or not such an action optimises the drilling operation.

The disclosure extends to software that, when installed on a computer, causes the computer to perform the method as described above.

BRIEF DESCRIPTION OF DRAWINGS

Embodiments of the disclosure are now described by way of example with reference to the accompanying drawings in which:—

DESCRIPTION OF EMBODIMENTS

Figure 1:
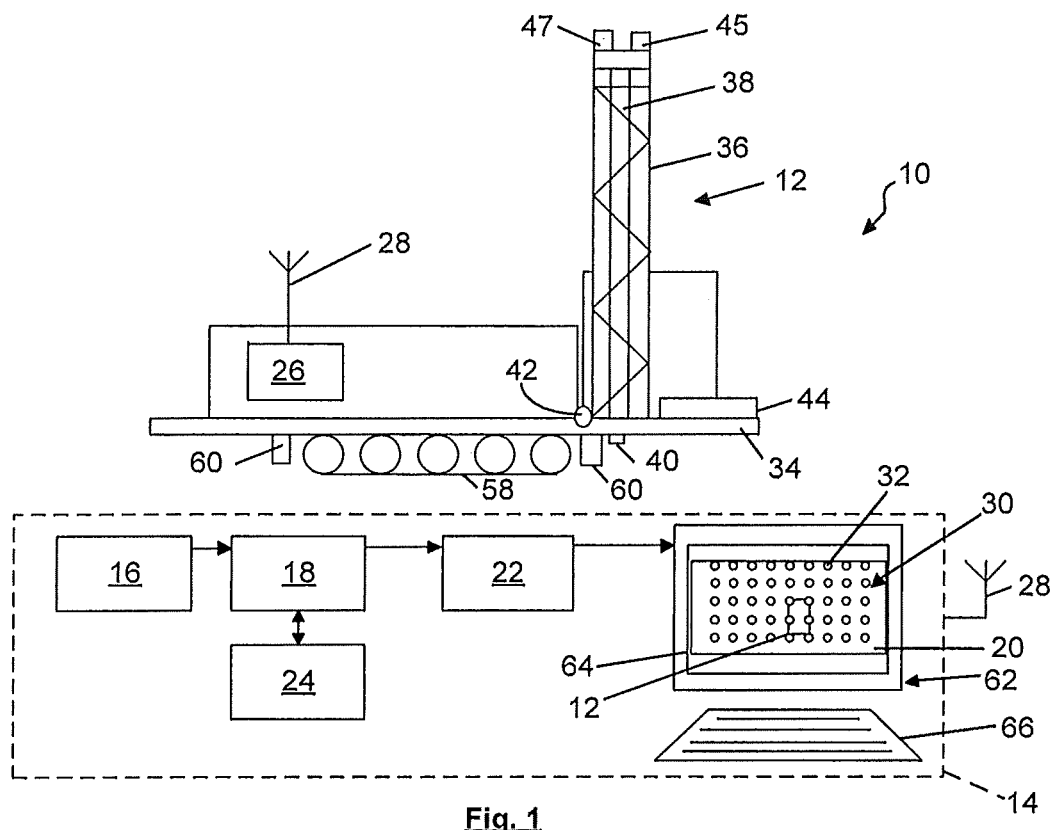
FIG. 1 shows a schematic representation of a drill rig and a system for controlling a drilling operation carried out by the drill rig.

In FIG. 1 of the drawings, reference numeral 10 generally designates a system for controlling a drilling operation by a drill rig 12. The system 10 includes an operating system 14 comprising various modules. In particular, the operating system 14 comprises a receiver 16 for receiving sensed data relating to the drill rig 12 carrying out the drilling operation. The receiver 16 is in communication with a processor 18. The processor 18 is operative to process the sensed data to estimate at least one geological property of interest of a zone, such as a mine bench, 20 in which the drilling rig 12 is active.

The operating system 14 further includes a decision engine 22, configured as a part of the processor 18, but shown as a separate module for description purposes, to optimise the drilling operation by automatically changing at least one drilling related parameter during the drilling operation based on the geological property, or properties, of interest.

The operating system 14 also includes a geological model of the bench 20 to be drilled which is stored in a database 24 and with which the processor 18 is in communication.

The modules 16, 18 and 22 of the operating system 14 are implemented in software and can either form part of a controller 26 of the drill rig 12 or may be arranged remotely from the drill rig 12 communicating with the drill rig 12 via a communications link 28, typically a wireless communications link.

While the system 10 has been developed particularly for use in controlling a drill rig 12 operative on a bench 20 of an open cut mine to drill a drill pattern 30 of blast holes 32 in the bench 20, those skilled in the art will readily appreciate that the system 10 could be used in other applications as well. Those other applications include, for example, drilling of sample or exploration holes in the bench 20, drilling an array of blast holes in a mine face in an underground mine, or the like. For ease of explanation, the disclosure will be described with reference to its application to the drilling of blast holes 32 in the bench 20.

The drill rig 12 includes a platform 34 which supports a drill mast 36. The drill mast 36 carries a drill string 38, an operatively lower end of which includes a replaceable drill bit 40. The drill mast 36 is pivotally arranged about a pivot point 42 on the platform 34 to pivot to the position shown, for example, in FIGS. 2-4 of the drawings to enable access to be gained to the drill bit 40 for maintenance and/or replacement purposes. The drill rig 12 further includes an auto bit changer module 44 carried by the platform 34 of the drill rig 12.

Further, the drill rig 12 includes a sensor pack, indicated schematically at 45 in the drawings, which provides sensed data relating to the status of various mechanical drilling parameters known as Measurement While Drilling (MWD) data and provides the sensed MWD data to the receiver 16. The MWD data include: rotation speed of the drill bit 40, rotation direction of the drill bit 40, pull down speed, pull down pressure, pull up speed, depth, air pressure, water fluid flow rate, rotation pressure, bit pressure, or the like.

In addition, the drill rig 12 has a position determining sensor 47, such as a GPS unit, for monitoring and locating the position of the drill rig 12 on the bench 20. The position determining sensor 47 is, in an example, a high precision GPS (HPGPS) unit.

The auto bit changer module 44 is shown schematically in FIG. 1 of the drawings to be standing proud of the platform 34. However, this has been illustrated in this way purely for description purposes. In practice, the auto bit changer module 44 is housed within the platform 34 as shown more clearly in FIGS. 2-4 of the drawings. The auto bit changer module 44 includes a cover member 46 (FIGS. 3 and 4) covering a cradle 48. The cradle 48 comprises a plurality of receptacles 50, in each of which a drill bit 40 is receivable.

In the illustrated embodiment, only two drill bits 40.1 and 40.2 (FIG. 4) are shown. It will be appreciated that, if necessary, a greater number of drill bits 40 are able to be housed in the cradle 48.

Figure 3:
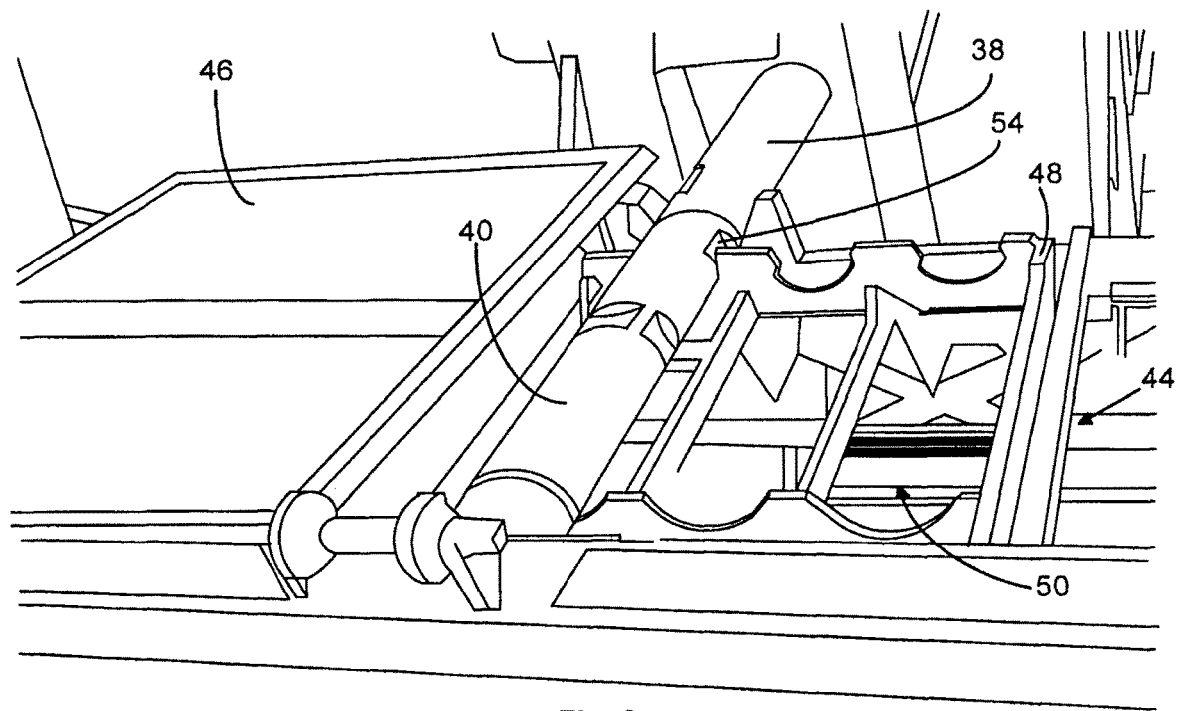
Figure 4:
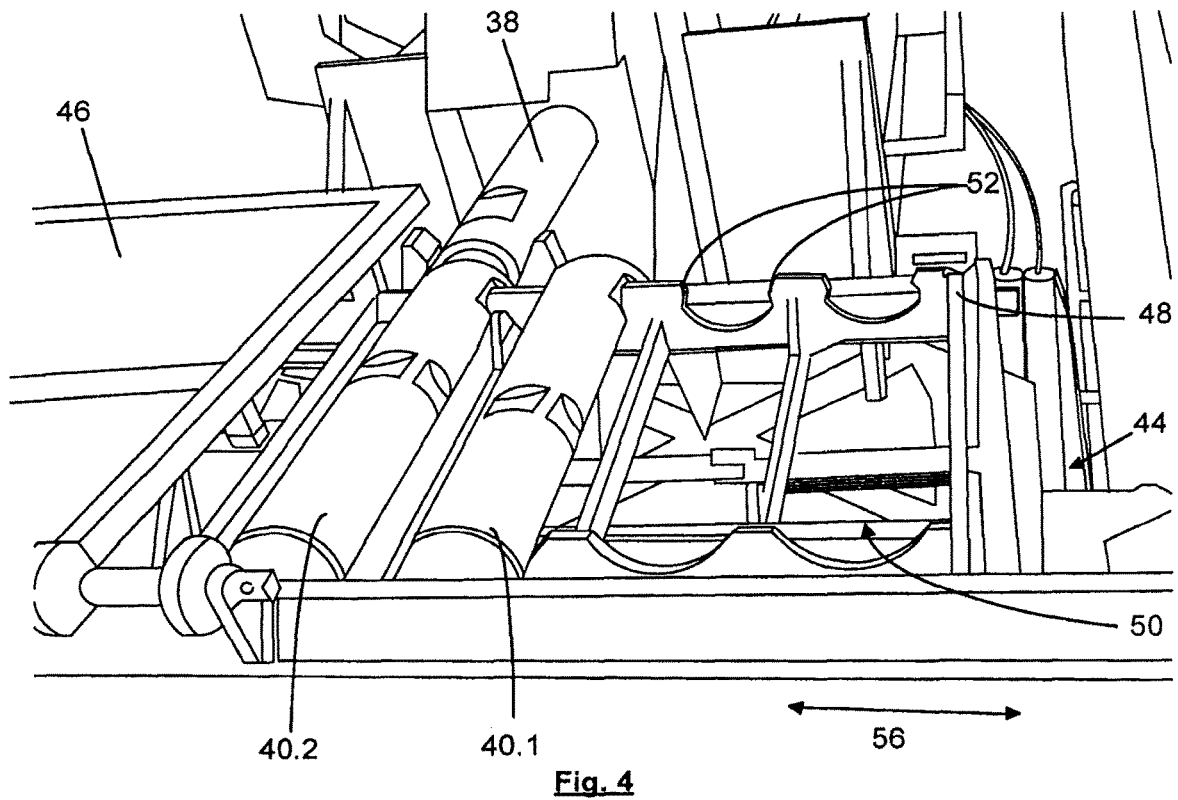

The cradle 48 is pivotally displaceable on the platform 34 to pivot into the position shown in FIGS. 3 and 4 of the drawings to align one of the receptacles 50 with the drill string 38 of the drill rig 12 when the mast 36 has been pivoted to expose the drill bit 40. In this orientation, the drill bit 40 at the end of the drill string 38 can be received in that receptacle 50 in register with the drill bit 40 at the end of the drill string 38. An upstream end of each receptacle 50 has a pair of opposed jaws 52. The jaws 52 engage opposed flats 54, one of which is shown in FIG. 3 of the drawings, to restrain the drill bit 40, when received in its receptacle 50, against rotation. By counter rotation of the drill string 38, the drill bit 40 is disconnected from the drill string 38.

The cradle 48 is displaceable laterally relative to the platform in the direction of arrows 56. Thus, referring to FIG. 4 of the drawings, once the drill bit 40.1 has been disconnected from the drill string 38, the cradle 48 is displaced laterally relative to the drill string 38 so that a new drill bit 40.2 to be connected to the drill string 38 is brought into alignment with the end of the drill string 38. Rotation of the drill string 38 relative to the drill bit 40.2 connects the drill bit 40.2 to the drill string 38 for subsequent use.

The cradle 48 carries either a plurality of drill bits 40 of the same type and/or a plurality of different types of drill bits 40. In the former case, when one drill bit 40 becomes worn, the worn drill bit can be replaced with a new drill bit to improve drilling efficiency. In the latter case, the different types of drill bits cater for strata of different hardness to be drilled in the bench 20 and/or to cater for different drilling modes, such as, for example, rotary drilling versus percussive drilling. For example, the drill bit 40.1 may be suited for rotary drilling operations with the drill bit 40.2 being used for percussive drilling operations.

The auto bit changer module 44 is configured to operate automatically (as defined) under control of the controller 26 of the drill rig 12.

The platform 34 is supported on a pair of spaced tracks 58, one of which is shown in FIG. 1 of the drawings. A jack 60 is arranged at each end of each track 58, the jacks 60 depending from the platform 34. In use, the jacks 60 are lowered relative to the platform 34 when a drilling operation is to be effected to raise the tracks 58 off a surface of the bench 30.

The operating system 14 of the system 10 includes a user interface 62. The user interface 62 comprises a display 64 on which the bench 20 and the position of the drill rig 12 on the bench 20 is displayed. The user interface 62 also includes various inputting devices such as a keyboard 66, other pointing devices (not shown) and/or touch screen facilities on the display 64. The user interface 62 receives input from the processor 18 of the operating system 14 as well as, if necessary, from an operator of the operating system 14.

Figure 5:
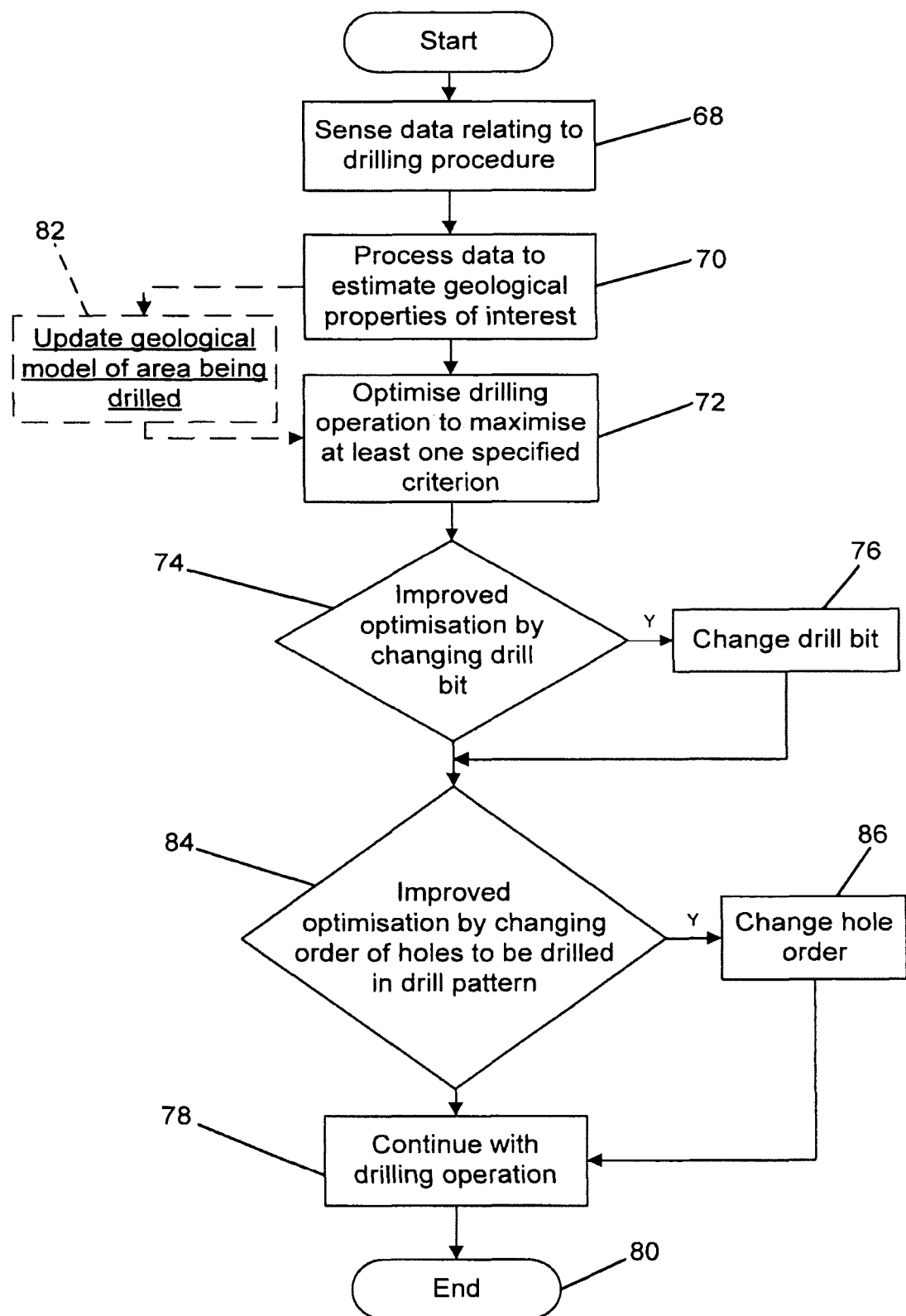
FIG. 5 shows a flow chart of an embodiment of a method of controlling a drilling operation by a drill rig.

Referring more particularly to FIG. 5 of the drawings, a method of controlling operation of the drill rig 12 is now described in greater detail.

As shown at step 68, the sensor pack 45 of the drill rig 12 senses the MWD data which, together with the position information sensed by the sensor 47, are made available to the processor 18 via the receiver 16. In addition, where the drill rig 12 is equipped with suitable sensors (not shown), geophysical data and geochemical data are also sensed by the sensor pack 45 with the geophysical data and geochemical data being made available to the processor 18 via the receiver 16.

Once the processor 18 has received the sensed data from the receiver 16, the processor 18 processes the received data to estimate geological properties of interest as shown at step 70 in FIG. 5 of the drawings. The geological properties of interest include boundaries, more particularly, geological boundaries between strata in the substrate of the bench 20 and metrics proportional to hardness of the substrate being drilled by the drill rig 12.

Based on the processed data and the estimated geological properties of interest, the decision engine 22 of the processor 18 then determines whether or not the drilling operation being carried out by the drill rig 12 is able to be optimised by changing at least one drilling related parameter during the drilling operation as shown at step 72 in FIG. 5 of the drawings. The decision engine 22 considers changing at least one of two parameters in determining whether or not the drilling operation is able to be optimised. The first parameter is changing the drill bit 40 and whether or not doing so would optimise the drilling operation and the second parameter which is considered by the decision engine 22 is an order in which the blast holes 32 of the drill pattern 30 are drilled and, whether or not changing the order of drilling the blast holes, based on the geological properties of interest which have been estimated by the processor 18, would optimise the drilling operation.

Figure 2:
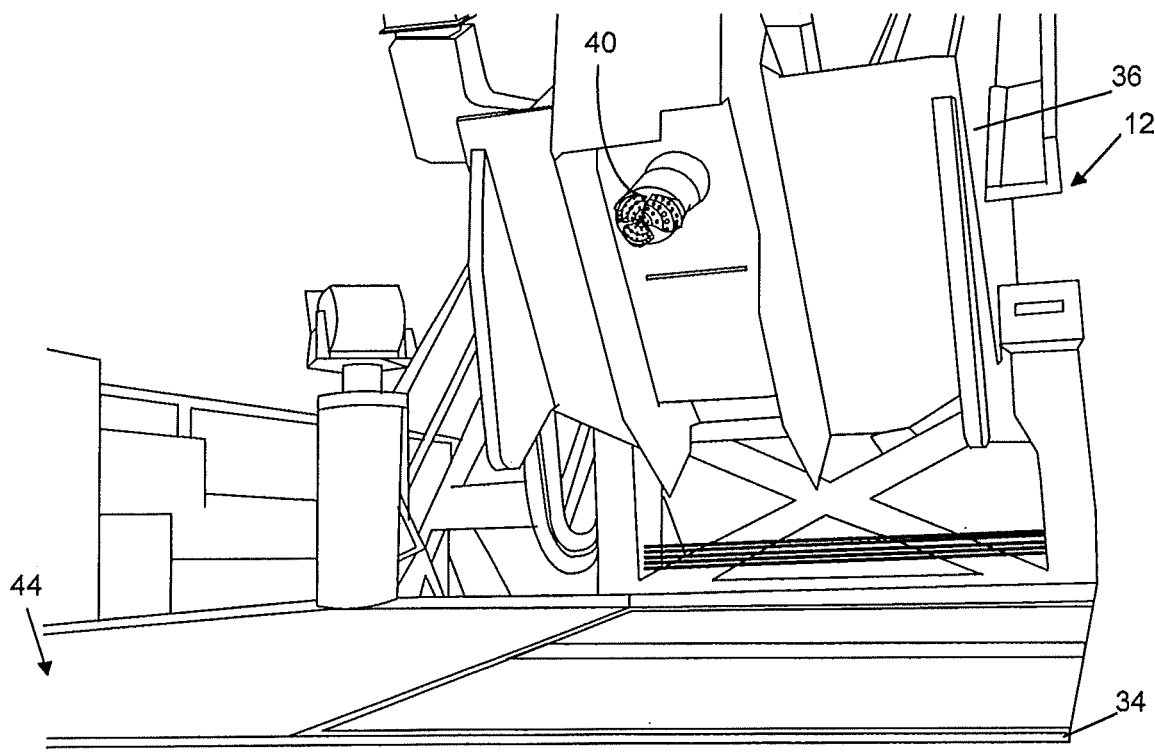
FIGS. 2-4 show screenshots of stages in an automated bit changing operation on a drill rig.

As will be appreciated, it is a time consuming operation to change the drill bit 40, whether automatically or manually, since the drill string 38 must be raised out of the hole being drilled, the mast 36 pivoted to the position shown in FIGS. 2-4 of the drawings, the auto bit changer module 44 activated and the drill bit 40 replaced. Hence, as shown at step 74 in FIG. 5 of the drawings, the decision engine 22 factors into its decision the time taken to change the drill bit on the drill rig 12 in determining whether or not the drilling operation can be optimised.

If a determination is made that a more efficient drilling operation can be effected by way of changing the drill bit 40, the operating system 14 instructs the controller 26 to change the drill bit 40 as shown at step 76 in FIG. 5 of the drawings. This is an entirely automatic operation without operator intervention.

Once the drill bit 40 has been changed as shown at step 76 or a decision has been made by the decision engine 22 to continue with the drilling operation without replacing the drill bit 40, the drilling operation continues as shown at step 78 and, once the entire drill pattern 30 has been drilled in the bench 20, the drilling operation ends as shown at step 80.

The system 10 optimises drilling by the drill rig 12 to maximise a metric or metrics of interest as described above. In one embodiment, the system 10 optimises the drilling operation to maximise a rate of penetration of the drill bit 40 through the substrate of the bench 20 or, in other words, to minimise the time taken to drill a blast hole 32 in the bench 20. This is done by automatically selecting the most appropriate drill bit 40 for the geological properties of interest of the bench 20 as well as the drilling mode which is optimal for that geology. As indicated above, the geological properties of interest are determined by the MWD data, measured by the sensor pack 45 of the drill rig 12.

The MWD data are used directly in controlling the drill rig 12 via the processor 18. Instead, the MWD data are loaded into the model contained in the database 24 and the model is updated with the MWD data to be used by the processor 18 in controlling operation of the drill rig 12, as indicated at 82 in FIG. 5 of the drawings. As indicated above, one of the considerations in determining whether or not to change the drill bit 40 is factoring in the time taken automatically to perform any change of drill bit.

In another embodiment, the system 10 is operative to optimise the drilling mode and bit selection based on the MWD data from the sensor pack 45 and/or data in the model in the database 24, optionally suitably updated with the MWD data, to maximise drill bit life.

In a further embodiment, the system 10 is configured to optimise the drilling operation by changing the order in which the holes 32 of the drill pattern 30 are to be drilled in the bench 20 and burden based on the MWD data from the sensor pack 45 or the model contained in the database 24, optionally suitably updated with the MWD data from the sensor pack 46. This is shown at step 84 in FIG. 5 of the drawings. As an example, the processor 18 may determine that, as a result of the updated model, it would be more efficient to drill all holes in softer strata rather than harder strata first, or vice versa, rather than alternating between hard and soft strata with the associated required bit changes. Conversely, the processor 18 may determine that the time taken to change bits may be less than the time taken to tram sequentially to all hole locations in harder or softer strata, as the case may be, and may alter the drilling operation accordingly.

If the processor 18 determines that the hole order should be altered this is done by reprogramming a tramming program of the drill rig 12 as shown at step 86 following which the drilling operation continues as previously described and as shown at step 78.

In still a further embodiment, the system 10 is configured to optimise the drilling operation carried out by the drill rig 12 by a combination of changes, i.e., changing drill bit, drill mode and hole order to optimise drilling of the bench 20.

At present, a hole pattern 30 is drilled in the bench 20 using an automated drill rig with or without an auto bit changing module. However, an operator is still required to determine whether or not a drill bit should be changed in order to optimise the drilling operation based on MWD data received. Thus, operator intervention is still required. However, with the provision of the system 10, the need for operator intervention is obviated and the decision to change at least one drilling related parameter such as changing a drill bit and/or hole order of the pattern, is effected automatically resulting in improved drilling efficiencies and optimisation of the drilling operation.

It will also be appreciated that updating the model with the MWD data results in a more accurate geological model which has benefits in the subsequent charging of the blast holes with the required recipe of explosives. In other words, it enables the desired blast pattern to be achieved to be assessed more accurately and given effect to.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of controlling a drilling operation by a drill rig with a drill bit, the method including:
   sensing, by a sensor pack located on said drill rig, data related to the drilling operation;
   processing the sensed data using a processor to estimate at least one geological property of interest of a zone in which the drill rig is active; and
   based on the processed data and at least one geological property of interest, using a decision engine to determine automatically whether the drilling operation is able to be optimized by changing at least one drilling related parameter during the drilling operation,
   wherein the decision engine is configured as part of the processor and said decision engine makes said determination based on changing at least one of two drilling related parameters, and
   wherein the at least one drilling related parameter to be changed includes changing the drill bit of the drill rig, and the method includes factoring in time taken to change the drill bit in determining whether or not such an action optimizes the drilling operation.

2. The method of claim 1, further comprising:
   changing the drill bit in dependence on a mode of drilling of the drill rig selected to optimize the drilling operation.

3. The method of claim 1, wherein the drilling operation relates to drilling blast holes on a bench in an open cut mine.

4. The method of claim 1, wherein said sensed data is selected from the group consisting of: mechanical drill data, geophysical data, geochemical data, and any combination of the foregoing.

5. The method of claim 1, further comprising:
   providing the sensed data, via a communications link, to said processor for processing the sensed data to estimate the at least one geological property of interest, the at least one geological property of interest including boundaries between strata in a substrate being drilled by said drill rig and metrics related to the hardness of the substrate.

6. The method of claim 1, further comprising:
   optimising the drilling operation in respect of at least one specified criterion.

7. The method of claim 6, further comprising:
   selecting the at least one specified criterion from the group consisting of: maximizing rate of penetration of the drill bit or minimizing time taken to drill a hole, maximizing bit life, maximizing the rate of drilling the zone by changing an order in which holes of a drill pattern for the zone are to be drilled, and any of combination of the foregoing.

8. The method of claim 1, further comprising:
   optimizing the drilling operation by modifying operation of the drill rig directly based on one of said two drilling related parameters.

* * * * *